Sept. 23, 1969          C. J. CARDONA          3,468,463
MOTION PICTURE PROJECTOR
Filed Sept. 22, 1966          6 Sheets-Sheet 4
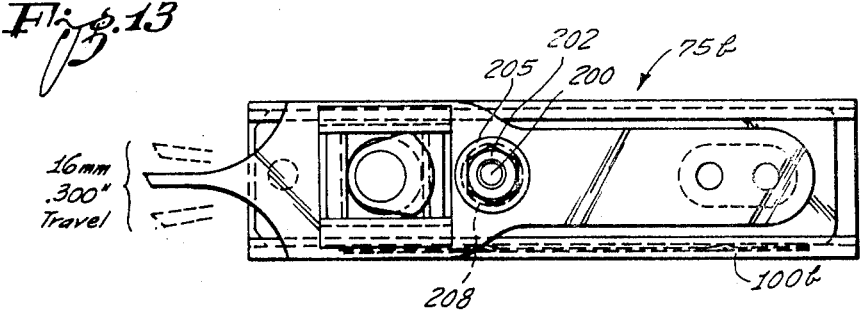
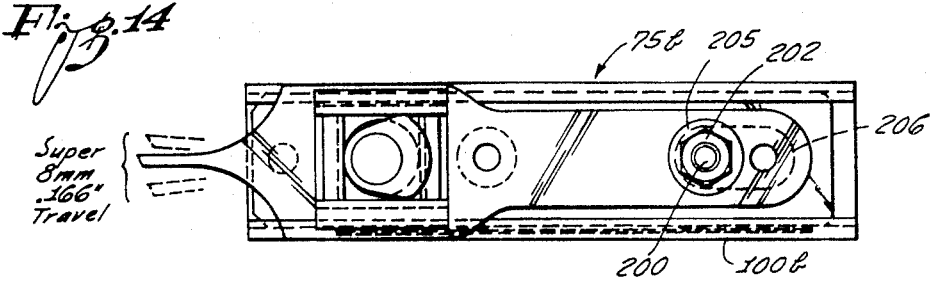
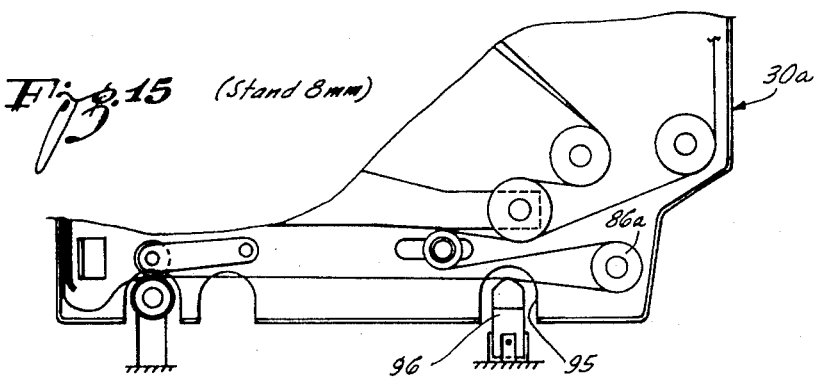
INVENTOR:
Carlos J. Cardona
ATTORNEYS

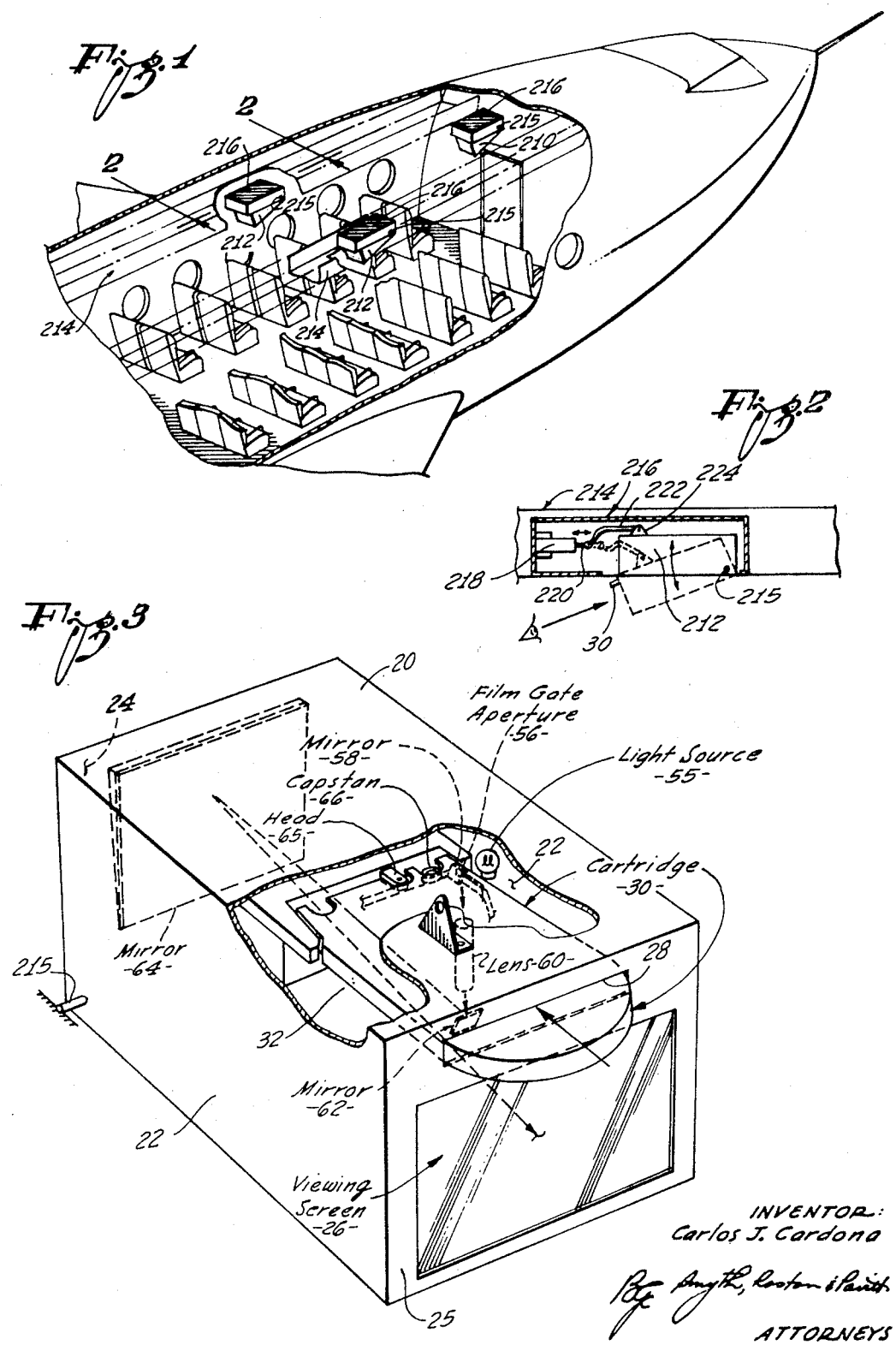

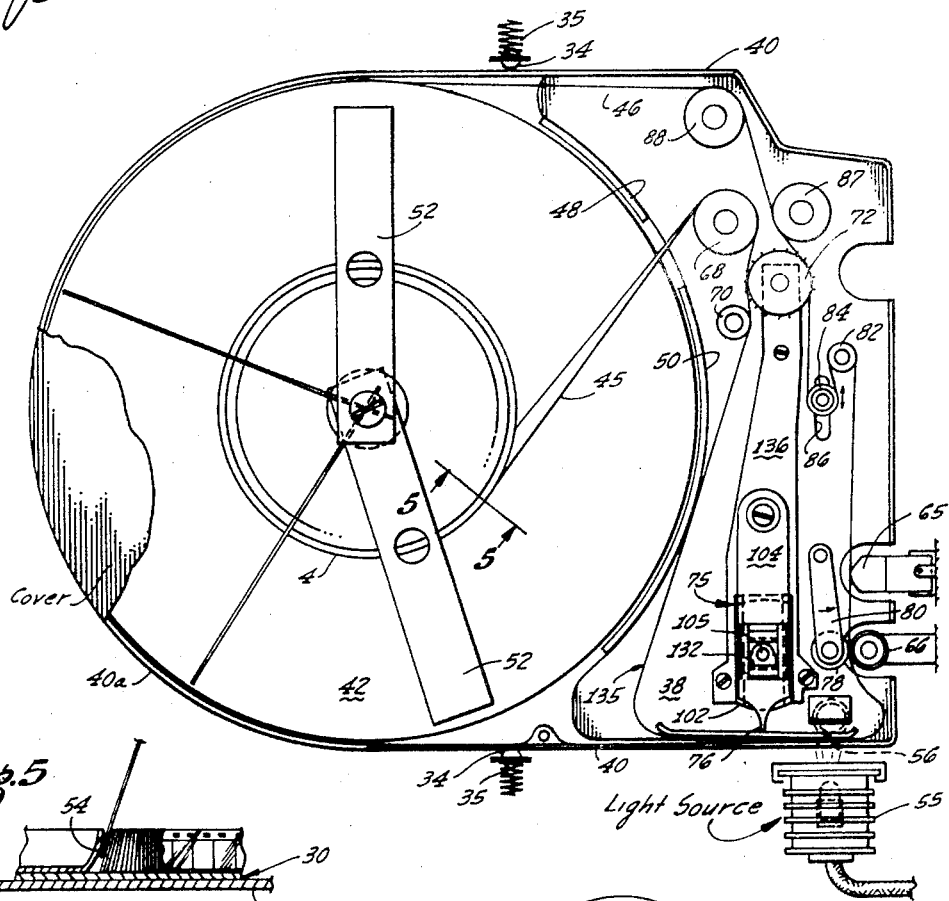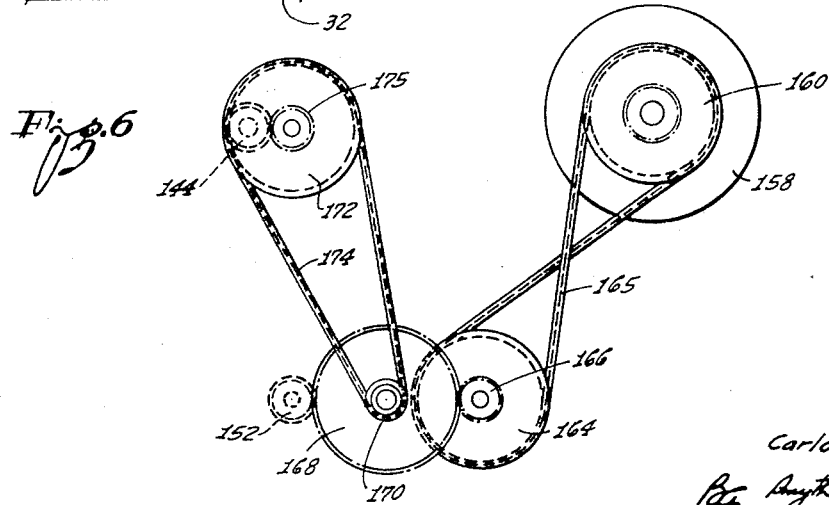

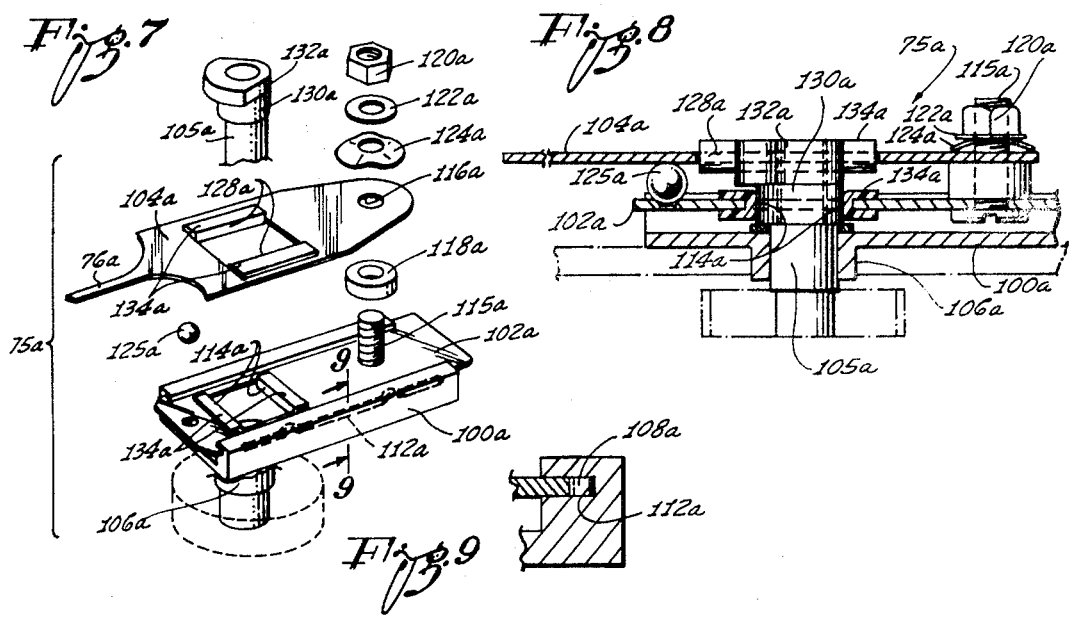
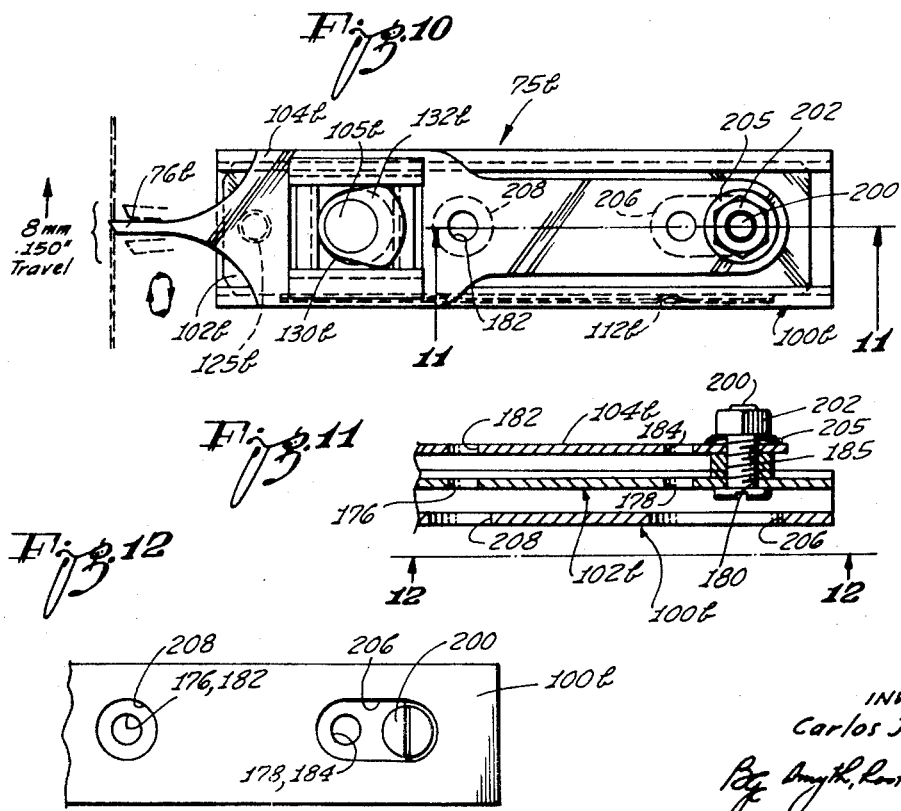

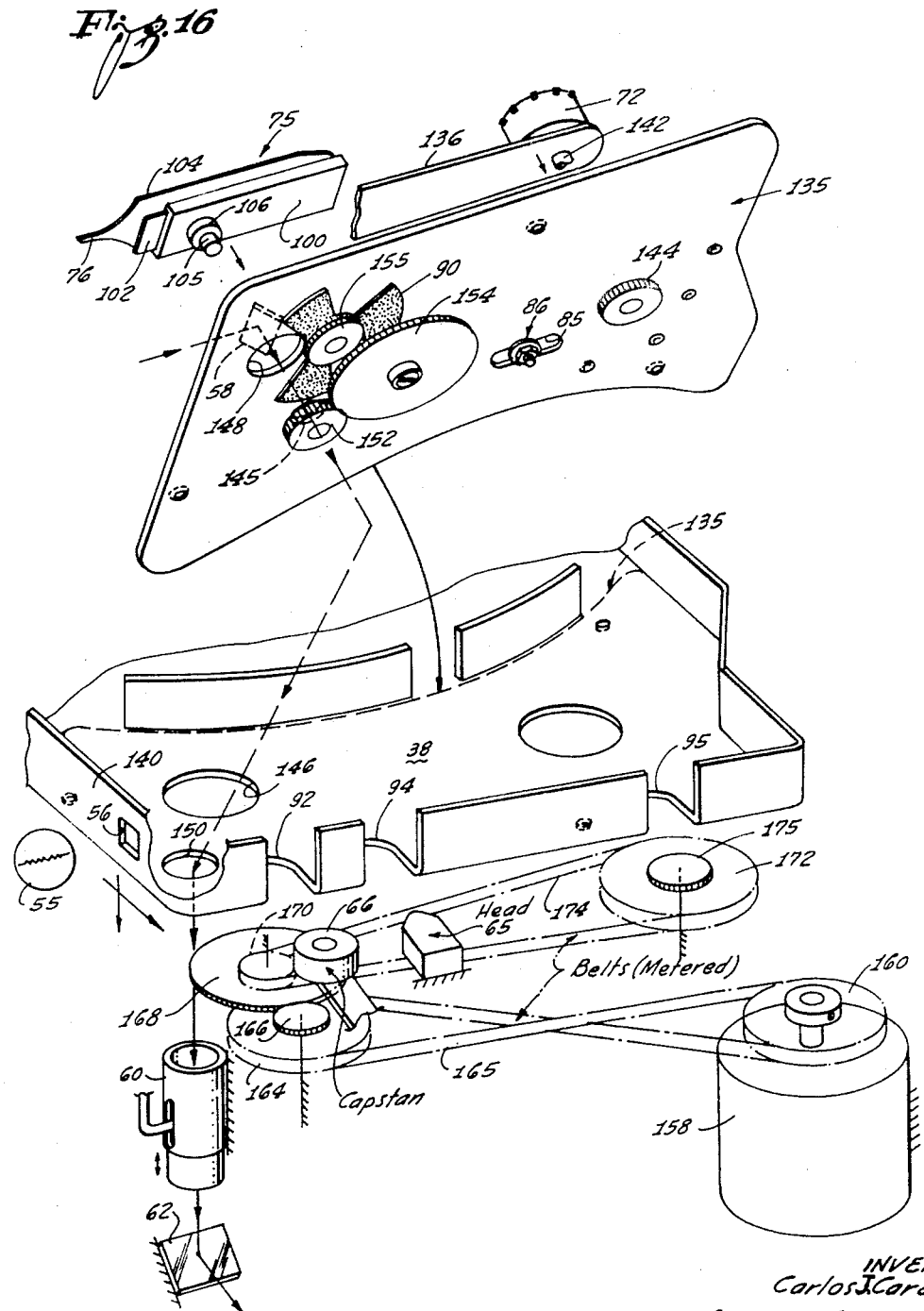

Sept. 23, 1969  C. J. CARDONA  3,468,463
MOTION PICTURE PROJECTOR
Filed Sept. 22, 1966  6 Sheets-Sheet 6
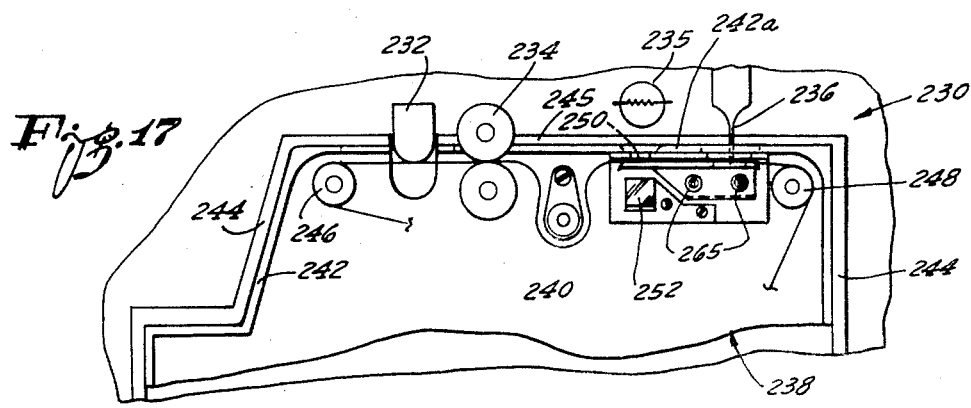
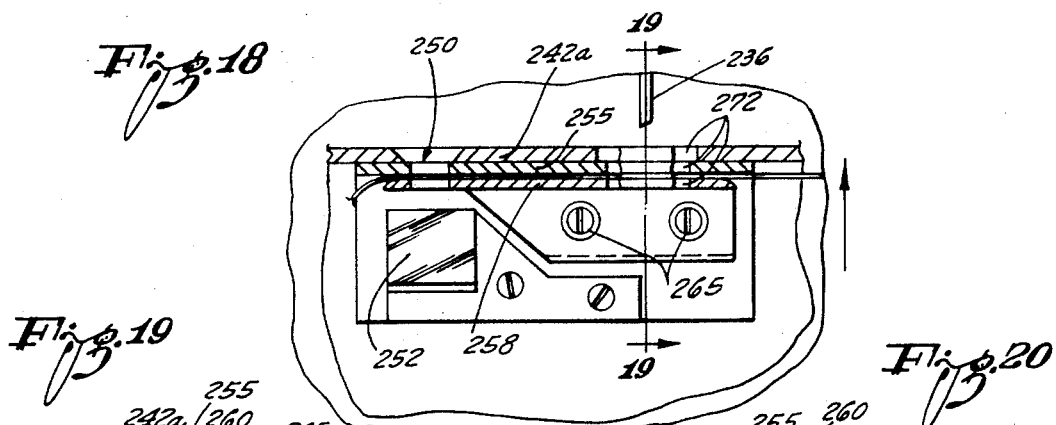
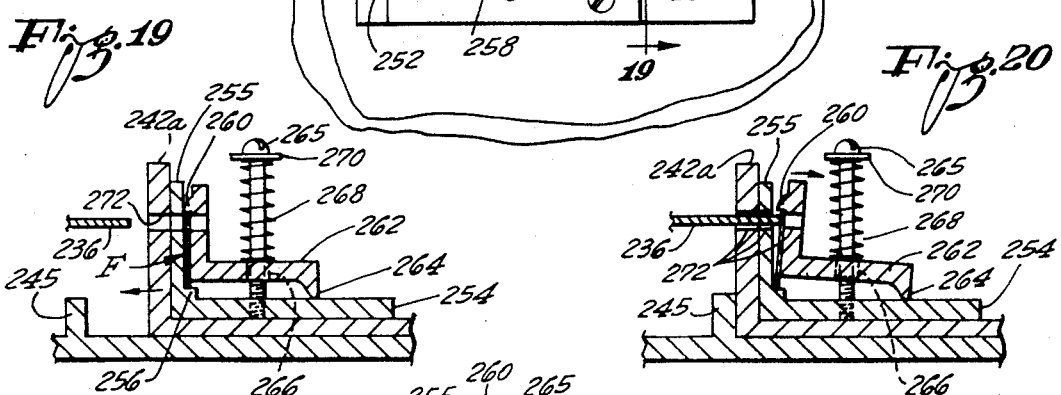
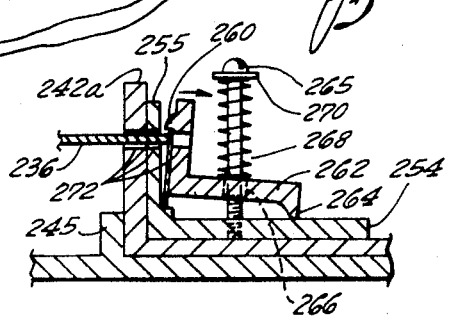
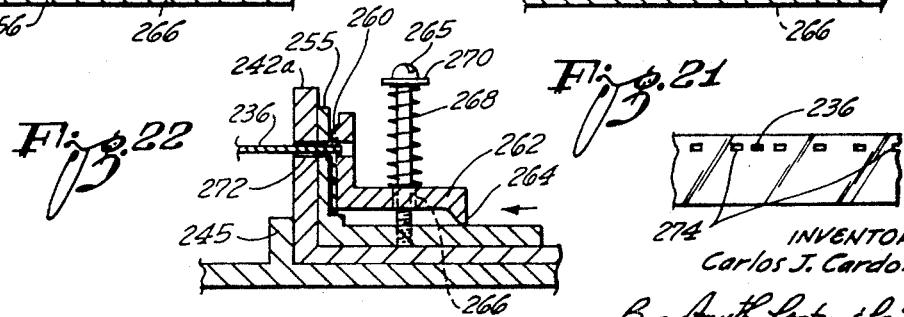
INVENTOR:
Carlos J. Cardona
ATTORNEYS

United States Patent Office 3,468,463
Patented Sept. 23, 1969

3,468,463
MOTION PICTURE PROJECTOR
Carlos J. Cardona, North Hollywood, Calif., assignor to Cardona Company, North Hollywood, Calif., a corporation of California
Filed Sept. 22, 1966, Ser. No. 581,364
Int. Cl. G03b 1/22
U.S. Cl. 226—64                        14 Claims

ABSTRACT OF THE DISCLOSURE

A motion picture projector which will accept cartridges of films of varying formats interchangeably. The film advancing mechanism is located in the cartridge and is adjustable to accept varying film formats.

---

This invention relates to a motion picture projector and is particularly directed to certain pressing needs for improvement in motion picture projectors. Motion picture projectors are not only in increasing demand by amateurs for home use but are also in steeply rising demand for education and for the newly developed field of entertainment on passenger aircraft. Meeting these needs involves a number of problems which are solved by the present invention.

One pressing need is for a projector employing film cartridges interchangeably so that changing films in the projector merely requires substitution of one cartridge for another. One problem involved in meeting this need is the problem of threading the newly substituted film into engagement with the film advancing mechanism of the projector. This problem is solved by incorporating the film advancing mechanism in the cartridge itself with provision for automatically connecting the film advancing mechanism of the cartridge with the power means of the projector when the cartridge is inserted into the projector. Thus with the film advancing mechanism incorporated in the cartridge the film may be permanently threaded into engagement with the film advancing mechanism prior to the insertion of the cartridge into the projector.

A new problem arises, however, in that a shutter is required to blank out the light beam during the intervals when the film is being advanced from frame to frame and the power actuated film advancing mechanism of the cartridge must be synchronized with the power actuated shutter. This subordinate problem is solved by incorporating the shutter mechanism in the cartridge along with the film advancing mechanism and arranging for the shutter mechanism to be automatically connected to the power source on the projector in response to the insertion of the cartridge into the projector.

The invention solves a number of other problems to make possible the basic concept of using film cartridges interchangeably in a motion picture projector. One of these problems resides in the fact that where a transducer or "sound head" is used in conjunction with the sound tract of a film, mounting the sound head in the cartridge creates the problem of electrically connecting the cartridge to the projector in a releasable manner. The invention avoids the necessity of such a releasable electrical connection by keeping the sound head on the projector and arranging for the cartridge to direct the film past the sound head.

A related problem is found in the necessity for employing a power-actuated drive capstan in combination with a flywheel to stabilize the movement of the film past the sound head. It would greatly increase the bulk and complexity of a cartridge to include the drive capstan in the cartridge structure and especially so if the associated flywheel is to be included. The solution to this problem is to arrange for the film in the cartridge to be directed past a drive capstan in the projector with the cartridge provided with a spring-actuated idler to press the film against the drive capstan.

Another problem involved in carrying out the cartridge concept is that the cartridge must include power-actuated sprocket means to wind and unwind the film. The invention meets this requirement by incorporating sprocket means in the construction of the cartridge and by providing for automatic connection of the sprocket means with the power means of the projector in response to the insertion of the cartridge into the projector.

Still another problem arises in that the film advancing mechanism and the associated shutter must be operated at one rate and the sprocket means for driving the film must be operated at a lower rate. If a single operative connection is used between the mechanism of the cartridge and the power means of the projector it becomes necessary to incorporate into the cartridge structure suitable gearing or the like to provide the required differential in operating rates. The invention avoids the need for any such gearing or the like in the cartridge by providing the cartridge with two operating connections that are effected simultaneously when the cartridge is inserted into the projector. One operating connection engages the film advancing mechanism and the shutter of the cartridge with a first drive gear on the projector and the other operating connection engages the sprocket means of the cartridge with a second slower drive gear on the projector.

A second need, which is important in many instances, is to eliminate the necessity for rewinding the film at the end of a showing in preparation for showing a second film. A third need which is in many instances related to the second need is to make it possible for continuously repeating the projection of a film without pauses for rewinding. The present invention teaches that these two needs may be met by employing an endless film in the cartridge so that when the end of the film is reached, the beginning of the film is ready to enter the film gate.

Another important need arises from the fact that now a new format is available for 8 mm. film which provides a much larger picture frame than has been available heretofore. With the larger picture frame, the film must be intermittently advanced by larger increments than heretofore, the result being that a film advancing mechanism suitable for the old format is not suitable for the new format and vice versa. With the increased use of the new format because of the higher picture quality, conventional 8 mm. motion picture projectors may become more or less obsolete. Probably in the near future the majority of educational 8 mm. film will be made on the new format but there are huge libraries of the older 8 mm. film that are valuable and cannot be replaced. It is obvious that a need has suddenly arisen for a motion picture projector that can handle both the old format and the new format.

The present invention meets this need by providing a motion picture projector which will accept cartridges of films of both formats interchangeably. A problem involved in carrying out this concept is to provide for the different magnitudes of intermittent advance required by the two types of film. The solution of this problem is inherent in the teaching of the invention that the film advancing mechanism may be incorporated in a cartridge rather than in the projector in which the cartridge is used. Thus where a cartridge incorporates mechanism for intermittent advance of standard 8 mm. film, the film advancing mchanism responds to the power means on the projector for the precise incremental advance that is required. On the other hand where a cartridge employs an 8 mm. film of the new format, the film advancing mechanism responds to the same power means on the projector by moving the film in longer increments.

Still another need is for an efficient, durable, reliable but greatly simplified film advancing mechanism. If the basic concept is to be carried out of incorporating the film advancing mechanism in the cartridge, it is mandatory that the film advancing mechanism be relatively simple and relatively inexpensive but at the same time accurate and efficient. As will be explained more fully, the invention meets this basic need by providing a reciprocating slide member with an oscillating film claw member pivotally mounted thereon, the two members being provided with respective apertures that at least partially register with each other. A third moving part comprises a single rotary member which extends into the two apertures and which is formed with cam elements to cooperate with the edges of the two apertures for actuating the two members in the desired sequence.

As heretofore stated the invention makes possible interchangeable use of cartridges of films of the two formats in a projector. It would be highly desirable to provide a cartridge construction which could be adapted to the two film formats interchangeably. Thus with a cartridge construction adjustable for either format only a single type of cartridge need be manufactured and the user may change over a cartridge from one adjustment to the other without the necessity of purchasing a new cartridge for use with the different format. A feature of the invention in this regard is that the new highly simplified film transport mechanism may be manufactured in a form that may be readily adjusted for the two types of 8 mm. film.

A still further need exists for a projector of the character described which may have a built-in screen for the projection of images or may be adapted to serve as a conventional projector for projecting images onto a remote large screen. The preferred embodiment of the projector of the present invention has a box-like housing with mirror means for directing the beam of light towards the front end of the housing. If a built-in projection screen is desired, a translucent sheet is used for the front end wall of the projected image on this screen. On the other hand, if projection on a larger remote screen is desired, the front wall is omitted and a different lens is substituted to focus the image on the distant screen. Finally the need exists for a compact and efficient system for motion picture projection on passenger aircraft. For this purpose the invention provides compact box-like projectors which may be mounted at appropriate overhead locations inside the aircraft. One feature of the invention in this regard is the concept of employing an overhead projector which may be readily retracted into a pocket on the underside of an overhead luggage rack. Another feature of the invention is the concept of providing means, for example hydraulic means, actuated by remote control for moving such an overhead projector between a lower position for motion picture projection and an upper position retracted into the configuration of a luggage rack.

The various features and advantages of the invention may be understood from the following detailed description together with the accompanying drawings.

In the drawings which are to be regarded as merely illustrative:

FIG. 1 is a fragmentary perspective view partly broken away to show how a plurality of overhead motion picture projectors may be mounted in an aircraft;

FIG. 2 is a somewhat diagrammatic section taken along the line 2—2 of FIG. 1 showing how a projector may be mounted to retract into an overhead luggage rack;

FIG. 3 is a diagrammatic perspective view of a box-like projector embodying a selected practice of the invention;

FIG. 4 is a plan view of a cartridge for use in a motion picture projector, the cartridge being adapted to handle the new format 8 mm. film;

FIG. 5 is a fragmentary cross section taken along the line 5—5 of FIG. 4 to show the configuration of a hub that may be employed in the cartridge for handling the supply of film;

FIG. 6 is a somewhat diagrammatic plan view of the power means and associated mechanism on the projector for operating the moving parts of the cartridge;

FIG. 7 is an exploded perspective view of one embodiment of the new film advancing mechanism;

FIG. 8 is a longitudinal sectional view of the film advancing mechanism;

FIG. 9 is an enlarged fragmentary section taken along the line 9—9 of FIG. 7 to show how a leaf spring cooperates with a slide member;

FIG. 10 is a plan view of another embodiment of the film advancing mechanism that is adjustable to cooperate with three different films, the film advancing mechanism being illustrated as adjusted for standard 8 mm. film.

FIG. 11 is a fragmentary section taken along the line 11—11 of FIG. 10;

FIG. 12 is a fragmentary bottom view of a portion of the second embodiment of the film advancing mechanism as seen along the line 12—12 of FIG. 11;

FIG. 13 is a plan view similar to FIG. 10 with the film advancing mechanism adjusted to cooperate with standard 16 mm. film;

FIG. 14 is a similar view showing the film advancing mechanism adjusted for the new format 8 mm. film;

FIG. 15 is a fragmentary view similar to FIG. 4 showing a cartridge adapted for handling standard 8 mm. film;

FIG. 16 is an exploded perspective view showing the moving parts of the cartridge and further showing the power means of the projector for actuating the moving parts of the cartridge;

FIG. 17 is a fragmentary plan view showing how a film cartridge cooperates with a projector wherein the intermittent film advance mechanism is incorporated in the projector instead of in the cartridge;

FIG. 18 is a fragmentary plan view showing the cartridge being advanced towards its installed position;

FIG. 19 is a transverse section taken along the line 19—19 of FIG. 18 to show the position of the film advancing claw relative to the approaching film cartridge;

FIG. 20 shows how a floating guide plate of the cartridge yields to the film advancing claw when the cartridge is initially installed with the claw out of register with the film sprocket holes;

FIG. 21 is a face view of the film in FIG. 20 showing the film advancing claw positioned between two successive sprocket holes in the film; and FIG. 22 is a view similar to FIG. 20 showing the film advancing claw engaging the film with the floating guide plate returned to its normal position.

As best shown in FIG. 3, the presently preferred embodiment of the projector includes a box-like housing having a top wall 20, two opposite side walls 22, a rear end wall 24 and a forward end wall 25. As shown in FIG. 3 the major portion of the area of the front wall 20 is occupied by a translucent panel 26 which functions as a projection screen in a well known manner. Above the translucent panel 26, the forward end wall 25 is formed with a slot 28 to permit the retractable insertion of a cartridge, generally designated 30, into the projector. It is to be noted that the slot 28 is near the top wall 20 of the housing and that the cartridge rests on an elevated shelf 32 to leave the major portion of the interior of the housing available for the optical system including the viewing screen or panel 26.

It is contemplated that the inserted cartridge will be releasably retained by suitable detent means. By way of example, FIG. 4 shows a well known detent arrangement comprising two detent balls 34 on opposite sides of the cartridge which are urged by corresponding springs 35 into releasable engagement with corresponding indentations on opposite sides of the cartridge.

It is to be understood that the cartridge 30 may take various forms in various practices of the invention. In this particular embodiment of the invention, as shown in FIGS. 4 and 16, the cartridge 30 has a body or support structure having a bottom wall or web 38 and an upstanding peripheral flange 40. In this particular embodiment of the invention the cartridge is adapted to hold a film supply in the form of an endless strip of film. The endless strip of film is wound in the form of an annulus, generally designated 42, that embraces a hub 44 that is unitary with the bottom wall or web 38.

The film is taken from the center or inside circumference of the annulus 42 as indicated by the short run 45 of the film in FIG. 4 and is returned to the outside circumference of the annulus as indicated by the short run 46. The hub 44 cooperates with a semi-circular portion 40a of the peripheral flange 40 and further cooperates with a pair of circumferentially spaced arcuate flanges 48 and 50 to form a shallow annular receptacle for the film annulus 42. In a well known manner, the annulus of film is retained in the shallow receptacle by a pair of keepers 52 which are mounted on the hub 44 to overlie the annulus.

A feature of the invention as shown in FIG. 5, is that the peripheral surface 54 of the hub is arcuate in radial section and overhangs the bottom wall 38 of the cartridge. It has been found that this hub configuration promotes separation of the short run of film 45 from the inner circumference of the annulus of film with minimum frictional resistance.

As indicated in FIG. 3, the optical system of the projector includes the following: a light source in the form of a lamp 55; a film gate providing a projection aperture 56; a small mirror 58 to intercept the beam of light from the lamp after the beam passes through the film and the projection aperture; a lens in a lens barrel 60 below the cartridge into which the small mirror directs the light beam; a second lower mirror 62 onto which the beam of light is directed by the lens; and a third relatively large mirror 64 mounted on the rear end wall 24 of the projector housing at a position and angle to reflect the beam onto the translucent screen 26. If the projector is to be employed to form a relatively large image on a screen remote from the projector housing, the translucent panel 26 is omitted and a different lens barrel is substituted to focus the image on the remote screen.

As shown in FIG. 4 the lamp 55 is carried by the projector separate and apart from the cartridge 30 and the only parts of the optical system that are carried by the cartridge are the film gate that provides the projection aperture 56 and the first mentioned small mirror 58 that directs the beam downward into the previously mentioned lens barrel 60. In this instance the projector employs film with a sound track and accordingly a transducer in the form of a sound head 65 is provided to pick up the sound signals and a stabilizing capstan 66 associated with the usual flywheel (not shown) is provided to stabilize the travel of the film and to cause the film to pass the sound head at a constant rate as distinguished from intermittent travel. In this particular embodiment of the invention, the sound head 65 and the stabilizing capstan 66 are permanently mounted on the motion picture projector as distinguished from the cartridge 30.

This particular embodiment of the cartridge 30 is adapted for handling the new format 8 mm. film as distinguished from 8 mm. film of conventional format. The components carried by cartridge 30 for controlling the strip of film includes: a first guide roller 68 to draw the film from the inner circumference of the annulus 42; an idler roller 70 to cooperate with the guide roller 68 to maintain the film in engagement with one side of a drive sprocket 27; a spring-loaded pressure plate 74 to press the film lightly against the inner surface of the peripheral flange 40 to keep the film immobilized when it is not being intermittently advanced; a film advancing mechanism, generally designated 75, having a claw element 76 for intermittently engaging the sprocket holes of the film to advance the film; an idler roller 78 on a spring-pressed pivoted arm 80 to hold the film in contact with the stabilizing capstan 66; a guide roller 82 to cooperate with the capstan 66 to hold the film in contact with the sound head 65; an idler roller 84 adjustable along a slot 85 and releasably anchored by a nut 86 (FIG. 16) for lip synchronism, i.e. to synchronize the sound track with the projected image; a guide roller 87 cooperative with the idler roller 84 to keep the film in engagement with the second side of the drive sprocket 72; a guide roller 88 which directs the returning film to the outer circumference of the annulus 42; and a rotary shutter 90 shown in FIG. 16 which intercepts the beam of light between the first mirror 58 and the lens barrel 60 while the film is intermittently advancing from frame to frame at the film gate.

As best shown in FIG. 16, the cartridge 30 is formed with three peripheral notches, namely a peripheral notch 92 to clear the stabilizing capstan 66, a second peripheral notch 94 to clear the sound head 65 and a third peripheral notch 95. As shown in FIG. 15, the third peripheral notch 95 clears an alternate sound head 96 of the projector that is used when a cartridge holds a supply of the new format 8 mm. film.

The construction of the film advancing mechanism 75 may be understood by referring to FIGS. 7, 8 and 9 which illustrate a film advancing mechanism, generally designated 75a, which is designed for controlling 16 mm. film. The film advancing mechanism 75a has a stationary part in the form of a guide means 100a and three moving parts comprising a lower reciprocative slide member 102a, an upper oscillatory member 104a providing a claw element 76a and a rotary means in the form of a shaft 105a which is journalled in a downwardly extending sleeve 106a that is unitary with the stationary guide means 100a. The lower slide member 102a is mounted in longitudinal grooves 108a in the opposite longitudinal side walls 110a of the guide means 100a, one of the two longitudinal grooves 108a being shown in FIG. 9.

In the construction shown, a suitable leaf spring 112a of undulating configuration is mounted in one of the guide grooves 108a to press the slide member lightly towards the opposite slide groove. This arrangement is advantageous since it permits liberal tolerance in the dimension of the parts and automatically compensates for wear.

The slide member 102a is formed with an aperture having two parallel straight edges 114a extending transversely of the slide member and spaced longitudinally of the slide member. The oscillatory member 104a is mounted by its rearward end on the rearward end of the slide member 102a by a suitable pivot means including a pivot pin 115a that is fixedly mounted on the slide member.

In the construction shown, the oscillatory member 104a has a small hole 116a to receive the pivot pin 115a and a washer 118a is mounted on the pivot pin to serve as a spacer between the oscillatory member and the slide member. A suitable nut 120a threaded onto the upper end of the pivot pin 115a acts against a plain washer 122a to compress a Belleville washer 124a against the oscillatory member, the Belleville washer being of undulating configuration. The front end of the oscillatory member is spaced from the front end of the slide member by a small ball 125a which may be a plastic ball seated in a socket 126a in the upper surface of the slide member. The ball rotates in the socket to function as a ball bearing to minimize resistance to oscillation of the oscillatory member. It is apparent that compressing the Belleville spring 124a against the oscillatory member 104a biases the oscillatory member into pressure contact with the ball 125a. Obviously other arrangements may be employed to provide the same bias.

The upper oscillatory member 104a is formed with an aperture having two laterally spaced parallel edges 128a.

The two respective apertures of the lower slide member 102a and the upper oscillatory member 104a at least partially register with each other to permit the shaft 105a to extend through both of the apertures. The shaft 105a is formed with an integral lower cam element 130a which cooperates with the parallel edges 114a of the lower slide member 102a and the shaft is further formed with an upper integral cam element 132a which cooperates with the parallel edges 128a of the upper oscillatory member. A feature of the invention in this regard is that the four parallel edges 114a, 128a are provided with liners 134a of a plastic such as Teflon that provides a low co-efficient of friction with respect to the cooperating cam elements, the liners being U-shaped in cross section embrace the metal edges of the apertures. The lower cam element 130a causes the lower slide member 102a to reciprocate to carry the claw element 76a into and out of engagement with the perforations of the film and the upper cam element 132 oscillates the upper oscillatory member 104a in correct time relation with the reciprocation of the lower slide member to cause the film to advance by increments of the required magnitude.

The film advancing mechanism 75 in the cartridge shown in FIG. 4 is designed to operate on 8 mm. film of the new format and, as indicated by corresponding numerals for corresponding parts is of the same construction as the above described film advancing mechanism 75a shown in FIG. 7. Since the increments of advance required for 8 mm. film of the new format are shorter than the increments of advance required for 16 mm. film, the slide member 102 and the oscillatory member 104 of the film advancing mechanism 75 differ in dimensions accordingly.

A feature of the construction of a cartridge in the preferred practice of the invention is that all of the moving parts of the cartridge are mounted on a separate plate that is designated 135 in FIGS. 4 and 16. A flat metal arm 136 is mounted on the plate 135 by suitable screws and carries at its outer end the previously mentioned film-driving sprocket 72 that is mounted on a shaft 142. The shaft 142 extends through the plate 136 and carries a suitable gear 144 on its lower end. The sleeve 106 of the guide means 100 of the film advancing mechanism 75 and the shaft 105 inside the sleeve extend through the strap 136 and an aperture 145 of the plate 135 and are positioned to extend through a corresponding larger aperture 146 in the bottom wall 38 of the cartridge. The previously mentioned small mirror 58 is mounted on the plate 135 in a position to reflect the light beams through an aperture 148 in the plate and a corresponding aperture 150 in the bottom wall 38 of the cartridge.

The shaft 105 that carries the two cam elements 130 and 132 carries a suitable gear 152 at its lower end which meshes with a gear 154 that is journalled on the underside of the plate 135. The gear 154 in turn meshes with a gear 155 that is also journalled on the underside of the plate 135 and is unitary with the previously mentioned 3-blade rotary shutter 90, the shutter being positioned for its blades to intercept the light beam that is reflected downward through the apertures 148 and 150 to the lens barrel 60 of the projector. The advantage of mounting the components of the cartridge 30 on the separate plate 135 is that all of the parts may be assembled to the plate 135 with maximum convenience and accessibility and then the plate may be assembled to the bottom wall 38 of the cartridge by suitable screws.

As shown in FIGS. 6 and 16 the power means on the projector for actuating the various moving parts including: a motor 158 having a drive pulley 160; a driven pulley 164 which is actuated by a crossed belt 165 and is formed with gear teeth to serve as a gear as well as well as a pulley; a relatively small gear 166 unitary with the driven pulley 164; a larger gear 168 that is in mesh with gear 166; a relatively small pulley 170 that is united with the gear 168 and is of smaller diameter; a larger pulley 172 that is driven from the small pulley 170 by a belt 174; and a relatively small gear 175 that is unitary with the large pulley 172. It is to be noted that the previously mentioned gear 152 of the cartridge is relatively thick and extends below the gear 154 of the cartridge. The gear 152 of the cartridge is so positioned as to move towards and mesh with the gear 168 of the projector when the cartridge is inserted into the projector and in like manner the gear 144 of the cartridge is positioned to move towards and engage with the gear 175 when the cartridge is inserted into the projector.

The manner in which the described combination of cartridge and projector serves its purpose may be readily understood from the foregoing description. When the cartridge is inserted into the projector and is releasably engaged by the detent means, the gears 152 and 144 respectively of the cartridge mesh with the corresponding gears 168 and 175 respectively of the projector for power actuation of the drive sprocket 72 together with the film advancing mechanism 75 and the shutter 90. At the same time the spring-pressed idler roller 78 of the cartridge presses the film against the capstan 66 as shown in FIG. 4 to cause the capstan to act on the film and to cause the film to make contact with the sound head 65. Insertion of the cartridge into the projector automatically places the projection aperture 56 of the cartridge in register with the beam of light from the lamp 55 of the projector so that the light beam will pass through the film and be reflected downward by the cartridge mirror 58 into the lens barrel 60. When the projector is operated, the film is continuously withdrawn from the annulus 42 and is continuously returned to the annulus with the film intermittently passing the projection aperture 56 and moving at a constant rate past the sound head 65.

FIGS. 10 to 14 show a film advancing mechanism generally designated 75b, which has the feature of being adjustable to handle any one of three films, namely standard 8 mm., new format 8 mm. and 16 mm.

The film advancing mechanism 75b is of the general construction heretofore described as indicated by the use of corresponding numerals to designate corresponding parts, the principal parts being a guide means 100b, a lower reciprocative slide member 102b and an upper oscillatory member 104b. The usual lower cam element 130b reciprocates the lower slide member 102 and the usual cam element 130b oscillates the oscillatory member 104b. Since the magnitude of the throw of the claw element 76b depends upon the distance of the shaft 105b from the pivot axis of the upper oscillatory member 104b and since the film advancing mechanism 75b is designed to operate on three different types of films, provision is made for adjusting the distance between the axis of the shaft 105b and the axis of oscillation of the oscillatory member 104b. The means for making such adjustment may vary with different practices of the invention.

In the present practice of the invention, the lower reciprocative slide member 102b is provided with three longitudinally spaced apertures 176, 178 and 180 as shown in FIG. 11 and the upper oscillatory member 104b is provided with three corresponding apertures 182, 194 and 195. A pivot member in the form of a screw 200 may be releasably mounted in any one of the three lower apertures 176, 178 and 180, the screw being releasably anchored by a nut 202. When the screw 200 is mounted in an aperture 176, 178 or 180 it extends through the corresponding aperture 182, 184 or 185 of the upper oscillatory member 104b. The nut 202 on the upper end of the screw 200 presses a Belleville spring 205 against the ocillatory member 104b to tighten the assembly. For access to the underside of the screw 200 the guide means 100b is formed with an elongated aperture 206 in the region of the two holes 178 and 180 of the slide member 102b and the guide means is further provided with an aperture 208 in the region of the aperture 176 in the slide member.

FIGS. 10 and 11 show the screw 200 mounted in the two rearmost holes of the slide member and the oscillatory member respectively to provide a relatively long distance between the screw and the axis of the shaft 105b to adapt the film advancing mcehanism for operating standard 8 mm. film. FIG. 14 shows the film advancing mechanism 76b adjusted for handling the new format 8 mm. film, the screw 200 being advanced to the next pair of holes in the slide member and oscillatory member respectively. FIG. 13 shows the screw 200 advanced to the third or forward pair of holes to adapt the film advancing mechanism 76b for operating 16 mm. film.

FIG. 15 shows how a film cartridge, generally designated 30a, is adapted to handle conventional 8 mm. film as distinguished from the new format 8 mm. film. It will be noted that the projector provides the previously mentioned transducer 96 for reading the sound track of the film. The film is guided in the usual manner but a roller 86a is substituted for the previously mentioned guide roller 86 at a location to cause the film to make contact with the transducer 96. It is apparent that if a film cartridge is equipped with the adjustable film advancing mechanism 75a shown in FIGS. 10 to 14, the same film advancing mechanism may be employed for both conventional 8 mm. film and the new format 8 mm. film.

FIGS. 1 and 2 show how the invention may be adapted for showing motion picture film on passenger aircraft. FIG. 1 shows a forward central projector 210 adjacent the ceiling of the aircraft and two projectors 212 on the opposite sides of the aisle mounted on the undersides of the two longitudinal luggage racks 214. The rear end of each of the three projectors is pivotally mounted by a pair of trunnions 215 in a box-like housing 216 to permit the projector to swing between an upper horizontal position inside the housing and a lower tilted position for displacing motion pictures. The box-like housing 216 of the forward central projector 210 is mounted on the surface of the ceiling but the box-like housings of the other two projectors 212 are mounted inside the corresponding luggage racks 214.

It is contemplated that each of the three projectors 210, 212 may be operated by remote control between its two positions. For this purpose a hydraulic cylinder 218 is mounted in each housing 216 and a piston rod 220 extending from the end of the cylinder is pivotally connected to a link 222 which in turn is pivotally connected to a bracket 224 on the upper side of the projector. It is a simple matter to lower the three projectors temporarily prior to a flight for the purpose of inserting film cartridges. Later when it comes time in the course of the flight to present the pictures, it is a simple matter to tilt all of the projectors downward by the remote control for the purpose of showing motion pictures to the passengers.

FIGS. 17 to 22 illustrate a slightly different practice of the invention wherein a film advancing claw is incorporated into the projector instead of being incorporated into the film cartridge. Thus in FIG. 17 the projector 230 has a sound head 232, a capstan 234, a lamp indicated diagrammatically at 235 and an intermittent film advancing mechanism of the character heretofore described having a claw element 236 to engage sprocket holes of the motion picture film.

A film cartridge, generally designated 238, adapted for use with the porjector has a bottom wall 240 and a peripheral upstanding wall or flange 242. A portion 242a of the flange 242 is the leading or front wall of the cartridge. The projector has spaced guide walls 244 to cooperate with the sides of the cartridge into its installed position and the projector is further formed with an upstanding transverse flange 245 to serve as a stop against which the leading end of the cartridge may abut when the cartridge is completely inserted into the projector.

The cartridge has provision for storing film and for driving the film and has a plurality of guide rollers including two guide rollers 246 and 248 which direct a portion of the film past the transducer head 232, the capstan 234, and a projection aperture 250 in the cartridge wall 242. The lamp 235 directs a beam of light through the projection aperture 250 onto the usual small mirror 252, the beam of light being reflected upward by the mirror 252 into the usual lens barrel (not shown). Incorporated into the construction of the projector is a rotary shutter (not shown) of the character heretofore described, the shutter overhanging the cartridge to intercept the beam of light between the mirror 252 and the lens barrel.

The structure of the cartridge in the region of the projection aperture 250 and the film claw 236 is shown in FIGS. 18, 19, 20 and 22. A base plate 254 is permanently mounted in the cartridge with an upstanding flange 255 of the base plate lying snugly against the front wall 242 of the cartridge. The flange 255 is formed with a step 256 to support the lower edge of the film, the film being designated F.

Mounted on the base plate 254 in a floating manner is an upright guide plate which confines the film against the flange 255. In the construction shown, the guide plate 258 has spaced projections 260 which normally overhang the upper edge of the traveling film and cooperate with the step 256 to confine the film edgewise. The guide plate 258 is formed with a lateral flange 262 which forms a downwardly extending lip 264 which rests on the base plate 254 and serves as a fulcrum.

Two spaced crews 265 extend through oversized holes 266 in the flange 262 of the guide plate and are rigidly screwed into the base plate 254. Each of the screws 265 carries a coil spring 268 under compression between the flange 262 of the guide plate and a washer 270 which backs against the head of the screw. It is apparent that the downward pressure of the two coil springs 268 against the flange 262 of the guide plate 258 will tend to hold the guide plate at its effective position shown in FIGS. 19 and 22, at which position the guide plate confines the film against the upstanding flange 255 of the base plate 254.

As may be seen in FIG. 18, the projection aperture 250 of the film cartridge extends through the front wall 242 of the cartridge, the upstanding flange 255 of the base plate 254 and the upstanding guide plate 258.

The cartridge 258 is also formed with a slot 272 to clear the film claw 236 and as may be seen in FIGS. 19, 20 and 22, the slots 272 extend through the three thicknesses comprising the front wall 242 of the cartridge, the flange 255 of the base plate 254 and the upright guide plate 258.

An important feature of the described structure is that it permits the cartridge 238 to be inserted into the projector without the necessity of taking care that the claw element 236 initially engages a sprocket hole of the film. FIG. 21, for example shows how the claw element, designated 236, may be positioned between two of the sprocket holes 274 in the film. When the cartridge is forced into abutment with the stop flange 245 of the projector with the claw element 236 out of register with a sprocket hole in the film, the claw element merely pushes against the face of the film and causes the guide plate 258 to rock away from the flange 255 as shown in FIG. 20. This tilting condition of the guide plate 258 is of brief duration because the claw element 255 in the course of its reciprocation immediately finds and enters a sprocket hole 236 of the film, whereupon the guide plate is restored to normal as indicated in FIG. 22. It is to be noted that the fact that the guide plate is floatingly mounted makes it easy to retract the guide plate manually sufficiently to permit the film to be inserted into the guide plate and the flange 255.

In some instances it is desirable to have the intermittent film advancing claw element 256 incorporated in the construction of the projector and, of course, it reduces the cost of the cartridge to eliminate the film advancing claw and the shutter from the cartridge. The problem solved by the construction shown in FIGS. 17 to 22 is to permit the cartridge to be shoved forceably into its installed position without concern for whether or not the claw element 236 registers with the sprocket holes in the film. The usual detent means is provided to releasably retain the cartridge in its installed position and the detent means is effective to keep the cartridge stationary in opposition to any force that may be created by the claw element initially tilting the guide plate.

My description in specific detail of the selected practices of the invention will suggest various changes, substitutions and other departures from my disclosure.

I claim:

1. A mechanism for the intermittent advance of a film having spaced sprocket holes, comprising:

means forming a guideway extending laterally from the path of the film;

a first member slidingly mounted in the guideway with a forward end of the first member directed towards the path of the film, said first member having a first aperture therein;

a second member overlying the first member and forming a claw element at its forward end extending forward from the first member, said second member being pivotally connected to the first member to oscillate transversely thereof, said second member having a second aperture therein at least partially registered with the first aperture; and rotary means extending through the two apertures, said rotary means including a first cam element cooperative with the edges of said first aperture to reciprocate the first member in the guideway for moving the claw element into and out of engagement with the sprocket holes of the film, said rotary means further including a second cam element cooperative with the edges of the second aperture to oscillate the second member relative to the first member to advance the film along said path.

2. A combination as set forth in claim 1 in which at least one ball element is interposed between the forward ends of the two members;

and in which one of said first and second members is formed with a socket for said ball element.

3. A combination as set forth in claim 2 in which one of said first and second members is resiliently biased towards the other member to place said ball element under slight compression.

4. A combination as set forth in claim 1 in which said means that forms the guideway provides a longitudinal guide wall along one longitudinal edge of the guideway; and in which spring means presses said first member laterally against said longitudinal guide wall.

5. A combination as set forth in claim 1 in which said first aperture has two straight parallel sides spaced apart longitudinally of the first member;

in which said second aperture has two straight parallel sides spaced apart laterally of the second member;

and in which each of said four straight sides is provided with a liner of low friction plastic for cooperation with the corresponding cam element.

6. A combination as set forth in claim 1 in which said means that forms the guideway is a fixed means.

7. A combination as set forth in claim 1 in which the edges of said first aperture of said first member completely close the first cam element.

8. A combination as set forth in claim 1 which includes spring means to urge said second member towards the plane of said first member.

9. A combination as set forth in claim 8 in which said second member has a hole therein and in which means extends through said hole to anchor one end of said spring means, the other end of said spring means acting against said second member.

10. A combination as set forth in claim 9 in which at least one ball element is interposed between the first and second members;

in which one of the first and second members is formed with a socket for said ball element;

and in which said spring means presses said second member against the ball element.

11. A mechanism for the intermittent advance of a film having spaced sprocket holes, comprising:

means forming a guideway extending laterally from the path of the film;

a first member slidingly mounted in the guideway with a forward end of the first member directed towards the path of the film, said first member having a first aperture therein;

a second member overlying the first member and forming a claw element at its forward end extending forward from the first member, said second member having a second aperture therein at least partially registered with the first aperture;

rotary means extending through the two apertures, said rotary means including a first cam element cooperative with the edges of said first aperture to reciprocate the first member in the guideway for moving the claw element into and out of engagement with the sprocket holes of the film, said rotary means further including a second cam element cooperative with the edges of the second aperture to oscillate the second member relative to the first member to advance the film along said path; and means to pivotally connect said second member to said first member selectively at points spaced longitudinally along the two members to vary the magnitude of the lateral movement of the claw element by the oscillation of the second member for advancing different types of film.

12. A combination as set forth in claim 11 in which said first member has a first set of holes spaced apart longitudinally thereof;

in which said second member has a second set of holes spaced apart longitudinally thereof;

and which includes pivot means adapted to be mounted in the holes of one of said two sets selectively to cooperate with the holes of the other set for pivotally interconnecting the two members.

13. A combination as set forth in claim 12 in which each of said two sets of holes includes two holes, one of the two holes being employed to adapt the mechanism to advance 16 mm. film and the other of the two holes being employed to adapt the mechanism to advance 8 mm. film.

14. A combination as set forth in claim 12 in which each of said two sets of holes includes two holes, one of the two holes being employed to adapt the mechanism to advance one type of 8 mm. film and the other of the two holes being employed to adapt the mechanism to advance another type of 8 mm. film.

References Cited

UNITED STATES PATENTS 2,475,622   7/1949   Kuehn              216—64 X

FOREIGN PATENTS 378,845   2/1940   Italy.

ALLEN N. KNOWLES, Primary Examiner